Feb. 6, 1968

G. F. WAKEFIELD 3,367,185

ELECTRIC FIELD DEPENDENT THERMALLY
ACTUATED HUMIDITY SENSOR
Filed Feb. 25, 1966

INVENTOR
GENE F. WAKEFIELD

Richard Harris & Hulland

ATTORNEY

United States Patent Office 3,367,185
Patented Feb. 6, 1968

3,367,185
ELECTRIC FIELD DEPENDENT THERMALLY ACTUATED HUMIDITY SENSOR
Gene F. Wakefield, Richardson, Tex., assignor to Texas Instruments Incorporated, Dallas, Tex., a corporation of Delaware
Filed Feb. 25, 1966, Ser. No. 530,155
8 Claims. (Cl. 73—336.5)

ABSTRACT OF THE DISCLOSURE

A device including a balanced bridge circuit network having two of its resistance arms heated and exposed to the atmosphere, plus a means for sensing a condition in the network. An electrode is placed coaxial to and extending substantially the length of one of said resistance arms, such that when a potential difference is established between said electrode and said one of said resistance arms an electric field is produced therebetween. The atmosphere reacts with said electric field producing an imbalance in the bridge network, said imbalance being an indication of relative humidity.

---

This invention relates to a sensor for determining humidity and more particularly to the use of an electrical field symmetrical to a resistance element which forms part of a bridge circuit where the element is exposed to the atmosphere to be sensed.

It has long been known that measurement of the relative humidity of air can be calculated from a knowledge of the dew point with reference to a vapor pressure curve. Pressures are read from such a curve at the temperature of the dew point and of the air under consideration and their ratio is computed to give the relative humidity.

It has been common practice to determine relative humidity experimentally with a psychrometer which consists of two suitably mounted thermometers. One thermometer has its bulb exposed to the atmosphere (dry bulb) and the other is wrapped with muslin and kept moist with water (wet bulb). The drier the atmosphere, the more rapid will be the evaporation of water from the muslin and the lower will be the reading of the wet bulb thermometer. The ratio of the two temperatures is representative of relative humidity. Humidity also has been measured with a hair hygrometer. Such a measurement depends upon the absorption of moisture by a strip of hygroscopic substance and upon the change of its length brought about by such absorption. A pointer coupled to such a strip moves as the length of the strip changes and indicates the condition of the atmosphere as either moist, dry, or very dry. Other systems are known.

The present invention is directed to a new method and system for measurement of humidity wherein two heated resistance arms of a bridge circuit are exposed to the atmosphere with one arm being selectively subjected to an electric field radially symmetrical to the resistance element forming said arm to alter the relationship between the said arm and paraelectric gas. As used in this application, paraelectric gas means a gas the atoms of which are so arranged as to form polar molecules.

More particularly in accordance with the invention a humidity sensor is provided wherein a bridge network has two heated resistance arms which are exposed to the atmosphere. An electrostatic field is established in the zone occupied by one of the heated arms to alter the condition in the network in dependence upon moisture present in the atmosphere.

In one embodiment an airstream moves through a flow channel which has two like branches with a cross channel interconnecting the two branches. The two heated resistances extend centrally through the cross channel. A cylindrical electrode is located in the cross channel symmetrical to the resistances and envelops only one of the resistances. A voltage source is connected between said resistances and the electrode for establishing a field which preferably is radially symmetrical to alter the network in dependence upon the water vapor content of the airstream.

For a more complete understanding of the present invention and for further objects and advantages thereof, reference may now be had to the following description taken in conjunction with the accompanying drawing in which.

Figure 1:
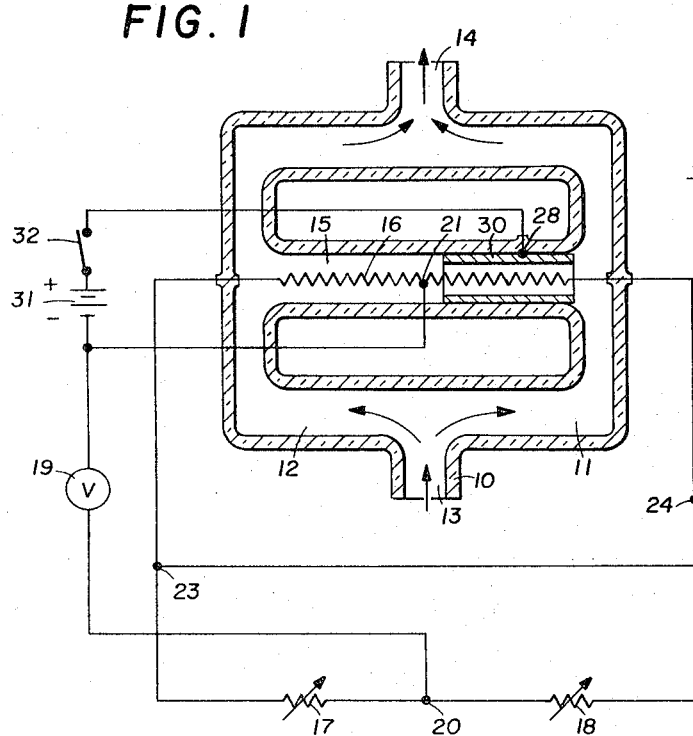
FIGURE 1 is a diagrammatic view of one embodiment of the present invention.

Referring now to FIGURE 1, one embodiment of the invention has been shown as including a duct 10 formed of a nonconducting material such as glass tubing. The duct 10 has two branches 11 and 12 which lead from the inlet 13 to an outlet 14. The system provides for measurement of the humidity of air flowing into the inlet 13.

The system includes a cross channel 15 which links the branches 11 and 12 at a midpoint. A center-tapped resistance element 16 extends centrally through the channel 15 and is connected in a series loop with resistors 17 and 18 to form a bridge. A voltage source 19 is connected across the bridge diagonal terminals 20 and 21. An output system including a detector amplifier 22 is connected across the bridge diagonal terminals 23 and 24. A control signal is thus produced and is supplied by way of channel 25 to a control unit 26 which in turn may control a humidifier unit or a dehumidifier unit 27.

The system serves to provide a bridge imbalance signal which is dependent in magnitude upon the moisture content of the air flowing into the inlet 13. Such a signal may be produced following an initial balance of the bridge network achieved by adjustment of the resistors 17 and/or 18. After the bridge is balanced, an electric field gradient established in the cross channel 15 in the region occupied by one-half of the resistance 16 causes an unbalanced state in the Wheatstone bridge or an equivalent.

A metallic electrode or cylinder 30 is mounted as to extend substantially one-half the length of the cross channel 15 and is coaxial with the resistor 16. A voltage source 31 is connected between the center tap point 21 and the electrode 30 by way of switch 32 and electrode terminal 28.

Figure 2:
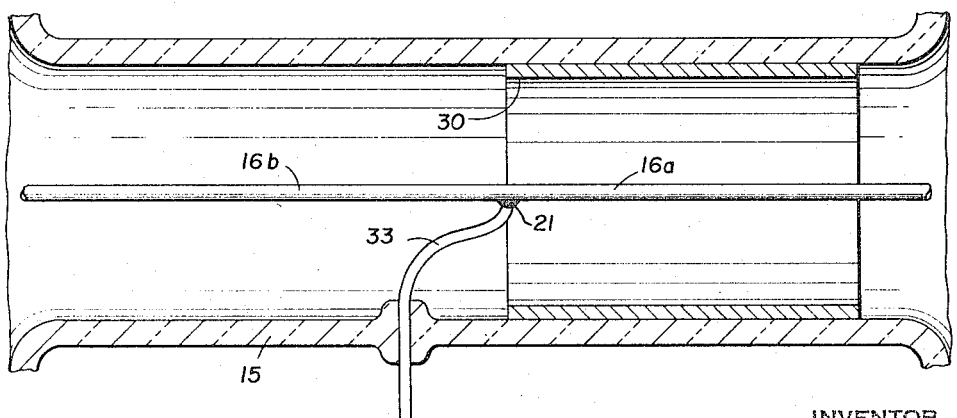
FIGURE 2 is an enlarged sectional view of a portion of the system of FIGURE 1.

As best shown in the enlarged view of FIGURE 2, the resistance 16 is preferably a cylindrical rod which extends through the cross channel 15. It is connected at its midpoint by a line 33 leading to the voltage source 19. The electric field gradient alters the gas flow pattern in and around the zone occupied by the half of the resistance 16a by interaction of the electric field gradient and the paraelectric gases in the environment around the resistance wire. The altered flow changes the amount of heat lost by the resistance wire 16a relative to the heat lost by the resistance wire 16b. The resulting changes in the relative resistances of the elements 16a and 16b causes an unbalanced state in the bridge. The imbalance of the bridge is therefore in proportion to the number of paraelectric molecules in the gas surrounding the resistor 16a. In air, water vapor is the only paraelectric gas of significant concentration.

By way of example, the resistance 16 may be a tungsten wire of .001-inch to .005-inch diameter and of the order of six to eigth inches in length, providing a resistance of the order of 10 to 100 ohms. When heated to a temperature of from 100° to 200° C., the bridge unbalance signal will be of the order of a few millivolts. It has been found that bridge imbalance of such magnitude is readily noted upon closing of switch 32. Either a D.C. or an A.C. bridge may be employed. Source 31 must be D.C., but may be connected in either polarity.

It is preferred that the geometry of the system be generally as shown in FIGURE 1, where the resistance 16 is positioned in a horizontal cross channel and thus not directly in the airstream. With this geometry, the system is sensitive to changes in moisture content but is substantially insensitive to flow rate.

Figure 3:
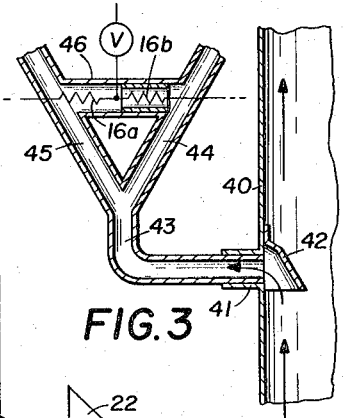
FIGURE 3 illustrates a modification of the invention shown coupled to a supply duct.

It will readily be apparent that such a unit may be coupled to a duct, as shown in FIGURE 3, where the duct 40 has a side vent 41 and a deflector 42 with a flow channel 43 leading to the branches 44 and 45. A cross duct 46 provides an enclosure for resistors 16a and 16b. It will be appreciated that separate resistor elements may be employed rather than the single rod shown in FIGURES 1 and 2.

Figure 4:
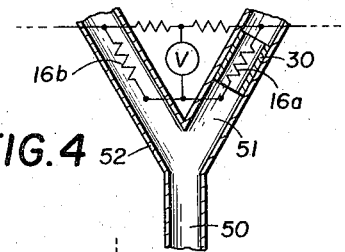
FIGURE 4 illustrates a modification of the invention in which the sensitive elements are in the flow path.

The system shown in FIGURE 4 may also be found suitable for applications where flow rates are constant or where they may be evaluated for correcting measurements from the bridge. In this case, the input duct 50 has branches 51 and 52 with the resistance 16a and the cylinder 30 mounted in the branch 51 and the resistance 16b mounted in the branch 52.

The sensitivity of the system having element 16a oriented with its axis horizontal will be greater than where the axis is at an angle to the horizontal.

Thus, in one aspect, the invention involves a new use of a bridge. The new use involves heating and exposing two adjacent arms of the bridge to an atmosphere and then establishing an electric field gradient symmetrical to one of the two arms. The resultant change in the condition of the bridge is then sensed as a measure of the humidity of the atmosphere.

Having described the invention in connection with certain specific embodiments thereof, it is to be understood that further modifications may now suggest themselves to those skilled in the art and it is intended to cover such modifications as fall within the scope of the appended claims.

What is claimed is:

1. A humidity sensor which comprises:
 (a) a bridge circuit network having input terminals and output terminals, said network including two resistance arms exposed to the atmosphere to be sensed, whereby current is applied to the bridge network and said network is balanced,
 (b) an electrode placed coaxial to one of said resistance arms and extending substantially the length of said resistance arm, and
 (c) terminal means adapted to be connected to a power supply, whereby when a power supply is connected to said terminal means a potential difference is established between said electrode and said one of said resistance arms, such that the interaction of the electric field established by said potential difference and the atmosphere produces an imbalance in said previously balanced bridge network, said imbalance being in proportion to the water vapor in the atmosphere.

2. The combination set forth in claim 1 in which said two arms are of cylindrical configuration and are maintained at a temperature from about 100° C. to about 200° C.

3. The combination set forth in claim 1 wherein a divided duct is provided through which said atmosphere passes and having a cross channel through which said arms extend substantially shielded from direct flow while exposed to said atmosphere.

4. The combination set forth in claim 3 in which said cross channel is horizontal.

5. The combination set forth in claim 3 where said divided duct is provided with one inlet port structure and one outlet port structure.

6. The combination set forth in claim 1 where said one of said resistance arms is oriented with its axis horizontal.

7. A system for sensing humidity of a moving airstream which comprises:
 (a) structure forming a flow channel for said airstream having two like branches with a cross channel interconnecting said branches,
 (b) a resistance means extending centrally through said cross channel,
 (c) a cylindrical electrode symmetrical to said resistance means enveloping half of said resistance means,
 (d) electrical components connected in circuit with said resistance means completeing bridge network and including a detector connected across one diagonal of said network and a source connected across the other diagonal of said network and adapted to elevate the temperature of said resistance means, and
 (e) means connected between said resistance means and said electrode for establishing a radially symmetrical electric field gradient to alter said network in dependence upon the water vapor content of said airstream.

8. An article of manufacture which comprises:
 (a) a duct system of electrically non-conductive material having an inlet port and an outlet port with two like branches interconnecting the inlet port and the outlet port,
 (b) a cross channel interconnecting said branches,
 (c) a pair of resistance elements extending end to end along the axis of said cross channel and having end terminals and a mid-terminal, and
 (d) an electrode having radial symmetry mounted in said cross channel and extending the length of one of said resistances whereby an electric field gradient symmetrical to one of said resistances may be established.

References Cited

UNITED STATES PATENTS

| | | | |
|---|---|---|---|
| 2,362,344 | 11/1944 | Bauer et al. | 73—75 |
| 2,732,710 | 1/1956 | Richardson | 73—336.5 X |
| 2,741,119 | 4/1956 | Neel | 73—336.5 X |
| 3,139,085 | 6/1964 | Custance et al. | 73—336.5 X |
| 3,161,056 | 12/1964 | Faus | 73—336.5 |

FOREIGN PATENTS 159,312   1964   U.S.S.R.

LOUIS R. PRINCE, *Primary Examiner.*

J. NOLTON, *Assistant Examiner.*